United States Patent
Kaneko et al.

(10) Patent No.: US 8,785,031 B2
(45) Date of Patent: Jul. 22, 2014

(54) POLYMER ELECTROLYTE FUEL CELL SEPARATOR MADE OF PURE TITANIUM OR TITANIUM ALLOY AND METHOD OF PRODUCTION OF SAME

(75) Inventors: Michio Kaneko, Tokyo (JP); Kazuhiro Takahashi, Tokyo (JP); Kiyonori Tokuno, Tokyo (JP); Hiroshi Kihira, Tokyo (JP); Wataru Hisada, Kitanagoya (JP)

(73) Assignee: Nippon Steel Sumitomo Metal Corporation, Tokyo (JP)

( * ) Notice: Subject to any disclaimer, the term of this patent is extended or adjusted under 35 U.S.C. 154(b) by 613 days.

(21) Appl. No.: 12/304,722

(22) PCT Filed: Jun. 15, 2007

(86) PCT No.: PCT/JP2007/062546
§ 371 (c)(1),
(2), (4) Date: Dec. 12, 2008

(87) PCT Pub. No.: WO2007/145377
PCT Pub. Date: Dec. 21, 2007

(65) Prior Publication Data
US 2009/0197143 A1 Aug. 6, 2009

(30) Foreign Application Priority Data
Jun. 15, 2006 (JP) ................. 2006-166114

(51) Int. Cl.
H01M 2/14 (2006.01)
H01M 2/16 (2006.01)
H01M 8/10 (2006.01)
B05D 5/12 (2006.01)

(52) U.S. Cl.
USPC ............ 429/129; 429/247; 429/479; 427/115

(58) Field of Classification Search
USPC .................... 429/129, 247, 479; 427/115
See application file for complete search history.

(56) References Cited

U.S. PATENT DOCUMENTS 6,863,987 B2   3/2005 Kaneko et al.
6,893,765 B1 *   5/2005 Nishida et al. ............... 429/481

(Continued)

FOREIGN PATENT DOCUMENTS

JP   2001-357862 A   12/2001
JP   2002-358974 A   12/2002

(Continued)

OTHER PUBLICATIONS

Seki et al., English machine translation of JP 2001-357862, Dec. 26, 2001, whole document.*

(Continued)

Primary Examiner — Roy King
Assistant Examiner — Caitlin Kiechle
(74) Attorney, Agent, or Firm — Birch, Stewart, Kolasch & Birch, LLP

(57) ABSTRACT

The present invention provides a polymer electrolyte fuel cell separator made of pure titanium or a titanium alloy superior in contact resistance with carbon paper and a method of production of the same, that is, a separator having a surface layer part to which conductive compound particles are affixed, characterized in that the surface oxide has a thickness of 3 to 15 nm in range, an average carbon concentration in a range from an outermost surface, including the oxide layer, to a depth of 100 nm is 0.02 to 6 at %, and the conductive compound particles have an average particle size of 0.01 to 20 μm. Further, the method of production of the present invention is characterized by forming, blast treating a surface of the formed article by particles comprised of conductive compound particles of an average particle size of 0.01 to 20 μm covering a surface of superhard core particles, impregnating it by a nitric acid aqueous solution of a concentration of 15 to 71 mass % and a temperature of 40 to 100° C. for 30 seconds to 180 minutes by spraying or dipping, then washing it.

1 Claim, 1 Drawing Sheet

(56) References Cited

U.S. PATENT DOCUMENTS

| | | |
|---|---|---|
| 7,776,486 B2 * | 8/2010 | Tarutani et al. ............... 429/491 |
| 2002/0192527 A1 | 12/2002 | Seido et al. |
| 2007/0259221 A1 | 11/2007 | Tarutani et al. |
| 2009/0226785 A1 * | 9/2009 | Kihira et al. ................... 429/30 |

FOREIGN PATENT DOCUMENTS

| | | |
|---|---|---|
| JP | 2006-140010 A | 6/2006 |
| JP | 2006-140095 A | 6/2006 |
| JP | 2007-5112 A | 1/2007 |
| WO | 2006/022027 A1 | 3/2006 |
| WO | 2006/137584 A1 | 12/2006 |

OTHER PUBLICATIONS

Supplementary European Search report issued on Jun. 22, 2010 in corresponding European patent application No. 0776737.1.3-1227 / 2031587.

* cited by examiner

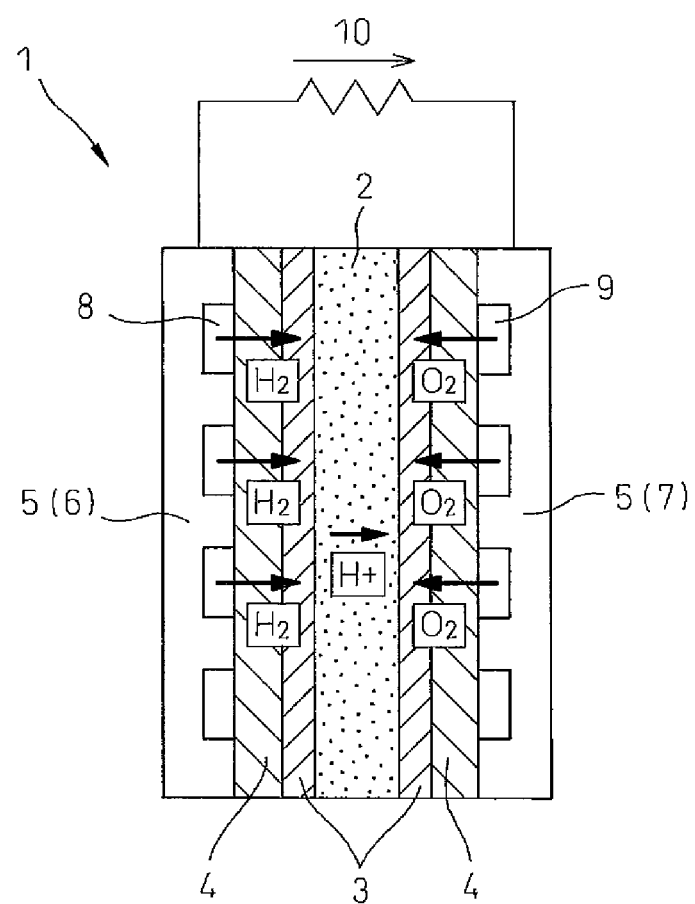

POLYMER ELECTROLYTE FUEL CELL SEPARATOR MADE OF PURE TITANIUM OR TITANIUM ALLOY AND METHOD OF PRODUCTION OF SAME

TECHNICAL FIELD

The present invention relates to a polymer electrolyte fuel cell separator made of pure titanium or a titanium alloy (hereinafter also simply referred to as "titanium") used for an automobile, small-sized power generation system, etc. and a method of production of the same, more particularly relates to a polymer electrolyte fuel cell separator made of pure titanium or a titanium alloy having a surface layer part to which conductive compound particles are affixed and a method of production of the same.

BACKGROUND ART

A polymer electrolyte fuel cell is a system for obtaining electric power using pure hydrogen, hydrogen gas obtained by conversion of alcohols, etc. as a fuel and electrochemically controlling the reaction with hydrogen and oxygen in the air.

A polymer electrolyte fuel cell uses a hydrogen ion selective permeation type membrane as an electrolyte, can be made more compact compared with a conventional alkali type fuel cell, phosphoric acid type fuel cell, molten carbonate type fuel cell, solid electrolyte type fuel cell, or other such fuel cell using as an electrolyte an aqueous solution-type electrolyte, molten salt type electrolyte, or other fluid medium, and is being worked on for application to electric vehicles etc.

The configuration of a typical solid polymer type fuel cell is shown in FIG. 1. That is, the polymer electrolyte fuel cell 1 is comprised of a hydrogen ion selective permeation type membrane 2 forming an electrolyte, a catalyst electrode part 3 comprising carbon fine particles and precious metal superfine particles provided on the two sides of this membrane 2, a current collector having the functions of taking out electrode power generated at this catalyst electrode part 3 as current and supplying reaction gas to the catalyst electrode part 3, that is, oxygen-based gas or hydrogen-based gas (usually carbon paper 4), and a separator 5 receiving current from the carbon paper 4 and separating the oxygen-based gas and hydrogen-based gas.

The basic principle of a polymer electrolyte fuel cell 1 is generally as follows. That is, in a polymer electrolyte fuel cell 1, the fuel, that is, the hydrogen gas ($H_2$) 8, is supplied from the anode side, passes through the gas diffusion layers of the carbon paper 4 and catalyst electrode part 3 to form hydrogen ions ($H^+$) which permeate through the electrolyte, that is, the membrane 2. At the cathode side catalyst electrode part 3, an oxidation reaction ($2H^+ + 2e^- + \frac{1}{2}O_2 \rightarrow H_2O$) occurs between the hydrogen ions ($H^+$) and the oxygen ($O_2$) in the air 9 supplied from the cathode side whereby water ($H_2O$) is produced. At the time of this oxidation reaction, the electrons 10 produced at the anode side catalyst electrode part 3 flow through the carbon paper 4 from the anode side separator 6 to the cathode side separator 7 whereby current and voltage are produced across the electrodes.

The membrane 2 comprises an electrolyte having a strong acidity fixed in a film and controls the dew point in the cell to function as an electrolyte for permeation of hydrogen ions ($H^+$).

A separator 5, a component member of a polymer electrolyte fuel cell 1, separates the two types of reaction gas, that is, the cathode side air 9 and anode side hydrogen gas 8, and performs the role as flow paths for the supply of the reaction gases and the role of exhaust the water produced by the reaction from the cathode side. Further, in general, the polymer electrolyte fuel cell 1 uses a membrane comprised of an electrolyte exhibiting a strong acidity. Due to the reaction, it operates at a temperature of about 150° C. or less. Water is produced, so the separator 5 of the polymer electrolyte fuel cell is required to have the material properties of corrosion resistance and durability and is required to have a good conductivity for efficiently conducting the current through the carbon paper 4 and a low contact resistance with the carbon paper.

In the past, carbon-based materials had been frequently used as the material for separators of polymer electrolyte fuel cells. However, separators comprised of carbon-based materials cannot be made thinner due to the problems of brittleness, so have obstructed compactness. In recent years, separators made from hard to break carbon-based materials have also been developed, but these are high in cost and therefore disadvantageous economically.

On the other hand, separators using metal materials do not have the problem of brittleness compared with carbon-based materials, so in particular greater compactness and further lower cost of the polymer electrolyte fuel cell system become possible. Therefore, separators using titanium or other metal materials are being developed and numerously proposed (for example, see Japanese Patent Publication (A) No. 2000-260439 and Japanese Patent Publication (A) No. 2000-256808).

However, there was the problem that separators made of titanium and titanium alloys became larger in contact resistance with the carbon paper due to the passive film formed on the surfaces and the energy efficiency of the fuel cells was greatly reduced.

For this reason, in the past, numerous methods have been proposed for reducing the contact resistance between a titanium separator surface and carbon paper.

For example, a separator for a polymer electrolyte fuel cell has been proposed which makes a noble metal or noble metal alloy bond with a titanium or stainless steel surface to reduce the contact resistance with carbon paper (for example, see Japanese Patent Publication (A) No. 2001-6713) etc. However, these methods had problems in that surface treatment forming a gold plating or other expensive noble metal layer for imparting conductivity on a titanium or stainless steel surface is required, so the cost of production of the separators increased.

On the other hand, various methods are also being proposed for reducing the contact resistance between the surface of separator materials and carbon paper while reducing the amount of use of expensive noble metal or not using them at all.

Further, the method of affixing hard fine powder having conductivity to the substrate surface by shot etc. has also been proposed. For example, a separator made of titanium in which $M_{23}C_6$ type, $M_4C$ type, or MC type conductive hard particles, where the metal element (M) includes one or more of chromium, iron, nickel, molybdenum, tungsten, and boron, are buried and dispersed in and exposed at the substrate surface (for example, see Japanese Patent Publication (A) No. 2001-357862) has been proposed.

The method of affixing such hard fine powder having conductivity to the substrate surface by shot etc. does not reduce the productivity compared with the method of using heat treatment or vacuum deposition and is advantageous in the point of being inexpensive in production costs and simple in method. On the other hand, in the method of mechanically driving hard conductive particles into a surface of a substrate of a metal separator molded to a desired shape by the blast method etc., strain is introduced into the substrate surface layer part causing the possibility of deformation and the separator sometimes falls in flatness.

In general, a solid polymer type fuel cell has an output voltage per cell of a low 1V or so, therefore to obtain the desired output, a large number of fuel cells are often stacked for use as stacked fuel cells. For this reason, in the method of affixing hard fine powder having conductivity to the substrate surface by shot etc., it is necessary to set the conditions and perform post-treatment to obtain a separator suppressing warping and strain in the separator and having a good flatness enabling stacking of the fuel cells.

In the above way, in the past, a metal separator of a polymer electrolyte fuel cell using as the separator substrate a titanium or other metal material superior in corrosion resistance and improving the contact resistance between the surface of the separator substrate and carbon paper by forming a conductive compound layer on the substrate surface by various metals or affixing conductive compound particles has been proposed, but this could not be said to have been sufficient from the viewpoint of the contact resistance and flatness required as a polymer electrolyte fuel cell separator and further the moldability or from the viewpoint of the productivity and production costs.

Further, from the inventors' study of the prior art, they learned that in a titanium or other metal separator affixing a conductive compound to the substrate surface to reduce the contact resistance of the separator surface, at the time of use of the fuel cell, there is the problem that metal ions are eluted from the conductive compound of the substrate surface into the MEA (membrane electrode assembly), the electromotive force falls and other battery characteristics deteriorate, and the power generation capability falls. On the other hand, in a metal separator comprised of a substrate on the surface of which a noble metal is plated or embedded as a conductive substance, there is no such problem, but as explained above, use of a noble metal has the problems of limited resources and higher production costs.

DISCLOSURE OF THE INVENTION

Therefore, the present invention, in consideration of the current state of the prior art, has as its object the provision of a polymer electrolyte fuel cell separator made of pure titanium or a titanium alloy having a surface layer part on which conductive compound particles are affixed, which solid polymer type fuel cell separator made of pure titanium or a titanium alloy has little deterioration of the battery characteristics such as a drop in electromotive force due to deterioration of the contact resistance and is superior in contact resistance of the separator surface with the carbon paper and a method of production of the same.

The present invention solves the above problems and has as its gist the following:

(1) A polymer electrolyte fuel cell separator made of pure titanium or a titanium alloy having a surface layer part to which conductive compound particles are affixed, the solid polymer type fuel cell separator made of pure titanium or a titanium alloy characterized in that the pure titanium or titanium alloy has surface oxide of a thickness of 3 to 15 nm in range, an average carbon concentration in a range from an outermost surface, including the oxide layer of the pure titanium or titanium alloy, to a depth of 100 nm is 0.02 to 6 at %, and the conductive compound particles have an average particle size of 0.01 to 20 μm.

(2) A polymer electrolyte fuel cell separator made of pure titanium or a titanium alloy as set forth in the above (1) characterized in that the conductive compound particles are comprised of one or more of $Cr_2N$, $CrSi_2$, VB, $V_8C_7$, VN, TaN, TaC, WC, and WN.

(3) A method of production of a polymer electrolyte fuel cell separator made of pure titanium or a titanium alloy comprising forming pure titanium or a titanium alloy, blast treating a surface of the formed article by particles comprised of conductive compound particles of an average particle size of 0.01 to 20 μm covering a surface of superhard core particles, impregnating it by a nitric acid aqueous solution of a concentration of 15 to 71 mass % and a temperature of 40 to 100° C. for 30 seconds to 180 minutes by spraying or dipping, then washing it so the pure titanium or titanium alloy has surface oxide of a thickness of 3 to 15 nm in range, the average carbon concentration from the outermost surface, including the oxide layer of the pure titanium or titanium alloy, to a depth of 100 nm is 0.02 to 6 at %, and a surface layer part is given to which the conductive compound particles having an average particle size of 0.01 to 20 μm are affixed.

(4) A method of production of a polymer electrolyte fuel cell separator made of pure titanium or a titanium alloy as set forth in the above (3) characterized in that the conductive compound particles are comprised of one or more of $Cr_2N$, $CrSi_2$, VB, $V_8C_7$, VN, TaN, TaC, WC, and WN.

(5) A method of production of a polymer electrolyte fuel cell separator made of pure titanium or a titanium alloy as set forth in the above (3) or (4) characterized in that the superhard core particles have an average particle size of 200 μm or less.

(6) A method of production of a polymer electrolyte fuel cell separator made of pure titanium or a titanium alloy as set forth in any one of the above (3) to (5) characterized in that a blast pressure in the blast treatment is 0.5 MPa or less.

BRIEF DESCRIPTION OF THE DRAWINGS

FIG. 1 is a view for explaining the configuration of a polymer electrolyte fuel cell.

BEST MODE FOR CARRYING OUT THE INVENTION

The present invention will be explained in detail below. As explained above, a separator 5, a component member of a polymer electrolyte fuel cell 1 shown in FIG. 1, has as a basic characteristic, conductivity, in particular a small contact resistance between the surface of the separator 5 and carbon paper 4 when receiving current from the carbon paper 4.

Further, the polymer electrolyte fuel cell 1 has an electrolyte having a strong acidity, that is, a solid polymer film 2, and produces water by a reaction proceeding at a temperature of about 150° C. or less, so the material of the separator 5 is required to have a corrosion resistance and durability able to sufficiently withstand this temperature and the corrosive environment at an acidic aqueous solution.

Based on the above point, the present invention is predicated on a polymer electrolyte fuel cell separator made of titanium having a good corrosion resistance at the above temperature in a corrosive environment of an acidic aqueous solution and having conductive compound particles at this surface layer part and has as the basic idea of the invention controlling the form of the conductive compound particles and treating the surface of the titanium using nitric acid.

First, the basic thinking of the present invention and the main parts of the invention will be explained. The inventors discovered that the contact resistance between titanium and carbon paper is high because of the contact resistance between the passive film of the titanium surface and the carbon paper and further discovered that to reduce the contact resistance, it is effective to affix conductive particles to the titanium surface.

The inventors confirmed from confirmation tests of the prior art etc. that a conventionally known separator having conductive compound particles affixed to the titanium surface layer part becomes larger in contact resistance of the separator surface and carbon paper along with the use of the polymer electrolyte fuel cell and due to this the fuel cell falls in electromotive force. Further, they learned that the cause of the drop in the electromotive force was the titanium ions eluted from the separator made of titanium surface at the time of use forming titanium oxide at the surface of the conductive compound particles affixed to the titanium surface layer part whereby the conductivity of the conductive compound particles deteriorated.

To suppress precipitation of titanium oxide on the conductive particle surfaces, titanium carbide on the titanium surface has an effect. The reduction of the carbon concentration at the titanium surface works effectively. That is, the average carbon concentration from the titanium outermost surface, including the oxide layer, to 100 nm in range has to be made 6 at % or less. However, if less than 0.02 at %, conversely, the contact resistance increases, though slightly, so the carbon concentration is made 0.02 at % or more.

As the method for reducing the carbon concentration at the titanium surface, annealing in an inert gas atmosphere or vacuum gas atmosphere at a high temperature for a long time or ordinary annealing followed by pickling, polishing, or other such means may be employed. This enables the objective to be achieved.

Now, to keep the initial contact resistance sufficiently low and suppress the increase of the contact resistance due to precipitation of titanium oxide on the conductive particles due to the elution from the titanium at the time of use, an oxide layer of the titanium surface having a certain degree of thickness becomes necessary. The thickness of the oxide of the titanium surface satisfying this object has to be at least 3 nm. However, if over 15 nm, the initial contact resistance increases, so the thickness is made 15 nm or less.

Note that the average carbon in the range of 100 nm from the titanium outermost surface and the thickness of the titanium oxide of the titanium surface can be measured by using an Auger electron spectroanalyzer or a surface analyzer having an equivalent performance. More specifically, Auger analysis is performed selecting as the interval for analysis in the depth direction from the titanium surface for example a suitable interval in the range from 0.1 nm to 0.6 nm and measurement is performed to a depth of at least 100 nm. The shorter the measurement interval, the more accurate the measurement, so measurement at 0.1 nm intervals is desirable, but limitations of the analyzer sometimes make measurement at 0.1 nm intervals possible, so the measurement interval was made 0.1 nm to 0.6 nm. If in this range, it is possible to obtain sufficient measurement points, so measurement with a sufficiently high reproducibility is possible.

The average value of the carbon concentration can be found by dividing the arithmetic sum of the concentration at the measurement points from the titanium outermost surface to a predetermined depth by the measurement points.

Note that to measure the depth from the surface, it is possible to use an ellipsometer, find the sputtering speed (Å/min) of $SiO_2$ under the same measurement conditions of an $SiO_2$ film of a known thickness, and convert from that value.

To calculate the thickness of the titanium oxide, the sputtering time at the position where the oxygen concentration at the titanium surface is halved is found, and the sputtering speed found using the above $SiO_2$ is multiplied with the sputtering time to find the oxide film thickness. Here, use is made of the position where the oxygen concentration at the titanium surface is halved because measurement is possible there with a high reliability without relying on the degree of vacuum in the analyzer.

Note that the average particle size of the conductive particles affixed to the titanium surface becomes important. That is, if the average particle size is less than 0.01 μm, the treatment performed using the nitric acid aqueous solution causes the particles to dissolve and the effects cannot be exhibited, so the conductive particles have to have an average particle size of at least 0.01 μm. On the other hand, if the conductive compound particles have an average particle size over 20 μm, when using blast particles comprised of conductive compound particles covering the surface of superhard core particles explained later for blast treatment of the titanium surface layer part, the depth of burial of the conductive compound particles in the titanium surface layer part becomes smaller and as a result the density of conductive compound particles in the surface layer part falls and the desired low contact resistance at the titanium substrate can no longer be obtained. However, when using a method other than blast treatment to affix conductive compound particles on the titanium surface layer part, it is not necessary to define the upper limit of the average particle size of the conductive compound particles from the viewpoint of the contact resistance of the titanium surface. From the above reasons, in the present invention, the average particle size of the conductive compound particles was made 0.01 to 20 μm.

According to the present invention, as a target, it is possible to achieve a polymer electrolyte fuel cell separator made of titanium having a low contact resistance with carbon paper of 15 mΩcm$^2$ or less at a surface pressure of 1.0 MPa (10 kgf/cm$^2$) and having little deterioration of the contact resistance at the time of use and consequent drop in electromotive force.

Note that as the conductive compound particles affixed to the surface layer part of the solid polymer type fuel cell separator of the present invention, a substance which has little elution and is chemically stable in the environment in the cell and reduces the contact resistance between the titanium surface and the carbon paper is necessary. From this viewpoint, the conductive compound particles have to be made a conductive compound comprised of one or more of $Cr_2N$, $CrSi_2$, VB, $V_8C_7$, VN, TaN, TaC, WC, or WN.

Below, the reasons for limitation of the method of production of a solid polymer type fuel cell separator of the present invention will be explained.

There are various methods for obtaining the above-mentioned polymer electrolyte fuel cell separator made of titanium, but the inventors discovered that treating titanium having a surface layer part to which conductive compound particles are affixed by dipping in or spraying by a nitric acid aqueous solution is extremely effective. As the nitric acid concentration, at least 15 mass % or more becomes necessary to achieve this effect. However, if the nitric acid concentration exceeds 71%, the speed of dissolution of the conductive particles affixed to the titanium surface rises, so 71% is made the upper limit. Note that preferably it is less than 60%.

Regarding the treatment temperature, to cause a reaction, at least 40° C. is necessary. The higher the treatment temperature, the shorter the time in which a sufficient effect can be obtained, but treatment over 100° C. has to be performed using a pressure vessel etc. and, further, the effect of shortening the treatment time also becomes substantially saturated, so the upper limit of the treatment temperature is made 100° C. Regarding the treatment time, to obtain at least the desired effect, a treatment time of 30 seconds or more becomes necessary. Note that making the treatment time longer will not result in deterioration of the characteristics. However, even if performing treatment over 180 minutes, the extent of improvement of the characteristics becomes substantially saturated, so 180 minutes is made the upper limit. Note that preferably the time is less than 120 minutes.

The treatment by the nitric acid aqueous solution can give substantially similar effects both with dipping or spraying. Further, after treatment by nitric acid, the titanium surface is sufficiently washed to prevent residual nitric acid aqueous solution.

Due to the limitations of the technical features in a polymer electrolyte fuel cell separator of the present invention explained above, it becomes possible to obtain a method of production of a polymer electrolyte fuel cell separator with a smaller contact resistance than in a conventional separator and able to suppress deterioration of the contact resistance in a usage environment of a polymer electrolyte fuel cell.

Note that in the method of production of a polymer electrolyte fuel cell separator of the present invention, the amount of the conductive compound particles affixed to the separator surface layer part does not have to be particularly limited, but to sufficiently obtain the above-mentioned action and effect of the conductive compound particles and reduce the contact resistance of the separator surface more, the density of conductive compound particles per unit area at the separator surface layer part is preferably made $1 \times 10^8/cm^2$ or more. Further, considering the variations at the time of manufacturer to stably reduce the contact resistance, it is more preferable to make the density $1 \times 10^{10}/cm^2$ or more.

In the present invention, as the method of affixing the conductive compound particles to the surface layer part after shaping the titanium, the titanium surface layer part is subjected to blast treatment.

The blast particles in the blast treatment must not deteriorate in characteristics even due to treatment by the strong acid of nitric acid when used as conductive compound particles affixed to the surface layer part of the polymer electrolyte fuel cell separator of the present invention. Conductive compound particles are required to have sufficiently stable properties chemically in a strong acid, so conductive compounds comprised of one or more of $Cr_2N$, $CrSi_2$, VB, $V_8C_7$, VN, TaN, TaC, WC, or WN are preferable. Further, conductive compound particles having an average particle size of 0.01 to 20 µm are used to obtain blast particles comprised of these conductive compound particles covering the surfaces of superhard core particles.

Further, the lower limit of the average particle size of the above conductive compound particles is made 0.01 µm to prevent elution during treatment by a strong acid. On the other hand, the upper limit of the average particle size of the conductive compound particles is made 20 µm since if the average particle size is over 20 µm, when performing blast treatment of the titanium surface layer part using blast particles comprised of conductive compound particles covering the surface of superhard core particles, the depth of burial of the conductive compound particles in the titanium surface layer part becomes smaller and as a result the density of the conductive compound particles in the surface layer part falls and the desired low contact resistance to the titanium substrate can no longer be obtained.

Further, the average particle size of the superhard core particles in the blast particles comprised of the above conductive compound particles covering the surface of superhard core particles does not have any effect on the contact resistance of the obtained separator surface, so does not have to be limited from the viewpoint of the contact resistance.

However, if the average particle size of the superhard core particles exceeds 200 µm, even if adjusting the blast pressure in the blast treatment, a flat separator shape becomes hard to obtain, so to stably secure a flatness enabling stacking as required for a polymer electrolyte fuel cell separator, the average particle size of the superhard core particles is preferably made 200 µm or less. More preferably, if the particle size is reduced, the blast energy given to the separator falls and finer adjustment of the flatness becomes possible, so the average particle size of the superhard core particles is preferably 100 µm or less.

Note that the hardness and material of the superhard core particles may be the hardness and material being used for usual blast treatment. For example, tungsten carbide etc. may be mentioned. Further, the above blast particles comprised of conductive compound particles covering the surface of superhard core particles may be produced using the method of adding to and mixing with the conductive compound particles, for example, a binder comprised of one or more of Co, Cr, Ni, Fe, Cu, and Sn in 1 mass % or more, then coating this on the surface of the superhard core particles.

Further, the blast pressure (impact energy) in the above blast treatment does not have any effect on the contact resistance of the obtained separator surface, so does not have to be limited from the viewpoint of the contact resistance. However, if the blast pressure becomes over 0.5 MPa, the amount of strain of the titanium surface layer part increases, the flatness of the separator shape becomes inferior, and securing stable, good flatness becomes difficult, so the upper limit of the blast pressure is preferably limited to 0.5 MPa or less. More preferably, the blast pressure may be limited to 0.3 MPa or less. This is because by reducing the blast pressure, the blast energy given to the separator falls and more delicate adjustment of flatness is possible. On the other hand, the lower limit of the blast pressure in the blast treatment need only be in the usual range of blast pressure of blast treatment and does not have to be particularly limited. If considering the work efficiency such as shape adjustment of the separator in the blast treatment, preferably the lower limit is 0.01 MPa or more.

Regarding pure titanium, usually use of pure titanium of JIS Type 1 (JIS H 4600) the most superior in workability is preferred. Note that the present invention can also be used for titanium alloy. Here, "titanium alloy" means for example the JIS Type 1 to Type 23 (JIS H 4600) improved in corrosion resistance by adding fine amounts of noble metal elements (palladium, platinum, ruthenium, etc.) However, a titanium alloy to which a platinum-group based alloy element is added easily generates hydrogen at the surface, so it becomes necessary to study the concerns over hydrogen embrittlement at the anode electrode.

EXAMPLES

Below, examples will be used to explain the present invention in detail. Pure titanium cold rolled annealed sheet of JIS Type 1 (JIS E 4600) with a length of 50 mm, a width of 50 mm, and a thickness of 0.2 mm and annealed, then pickled sheet, two types, were used as the substrate of the test material. The cold rolled annealed sheet was held under annealing conditions of vacuum and 600° C. for 5 hours, then furnace cooled. The carbon concentration at the titanium surface did not fall to the range of the present invention. The pickled material was made to dissolve by several μm, including the concentrated carbon layer at the titanium surface, in a mixed solution of nitric acid and fluoric acid. The carbon concentration at the titanium surface was in the range of the present invention.

The flow paths required for a fuel cell separator were formed, then particles of an average particle size of 0.01 μm to 20 μm made of $Cr_2N$, $CrSi_2$, VB, $V_8C_7$, VN, TaN, TaC, WC, or WN or mixtures of the same were covered on tungsten carbide-made superhard core particles of an average particle size of 100 μm to 300 μm mixed with a binder of Cu in an amount of 1 mass % with respect to the conductive compound. The particles were driven into the above test substrates by a blast pressure of 0.02 MPa to 0.5 MPa to obtain a test material.

Table 1 summarizes the results of measurement of the thicknesses of the titanium surface oxide layers of the invention materials and the comparative materials by an Auger electron spectrometer, then measurement of the changes in contact resistance when assembling these materials as separator members in single cells of polymer electrolyte fuel cells and generating power for 5000 hours. Table 2 summarizes the results of measurement of the thicknesses of the titanium surface oxide layers of the invention materials and comparative materials by an Auger electron spectrometer after spraying in or dipping by a nitric acid aqueous solution, then washing, then measurement of the changes in contact resistance when assembling these materials as separator members in single cells of polymer electrolyte fuel cells and generating power for 5000 hours.

The invention examples and comparative examples of Table 1 and Table 2 all had MEAs using a perfluorosulfonic acid film as the membrane. For the catalysts platinum was used for both the cathode electrode and anode electrode. The amount carried was 0.5 mg/$cm^2$. The electrode area was 10 cm×10 cm and the current density was 0.3 A/$cm^2$ for power generation. The temperature of the cell was 80° C. Air is used for the cathode electrode, the rate of utilization of the gas is 60%, the dew point is 70° C., pure hydrogen is used for the anode electrode pure hydrogen, the rate of utilization of the gas is 70%, and the dew point is 80° C.

For the contact resistance of the cathode side titanium separator after power generation, the carbon paper contact resistance value with the surface contacting the MEA was measured at a surface pressure of 1.0 MPa (10 kgf/$cm^2$). Cases of a value of contact resistance measured before power generation and after 5000 hours of power generation of 15 mΩ$cm^2$ or less were judged as having passing contact resistance, while cases of over 15 mΩ$cm^2$ were judged as having failing contact resistance. Note that Invention Example 1 (blast pressure of blast treatment of 0.5 MPa), Invention Example 2 (size of superhard core particles of 300 μm), and Invention Example 9 (blast pressure of blast treatment of 0.5 MPa) of Table 2 could be confirmed by the naked eye to have some residual working strain at the surface after blast treatment and slightly deteriorated flatness.

TABLE 1

| | Average carbon concentration (at %) in range of 100 nm from titanium surface | Thickness of titanium surface oxide (nm) | Type of conductive particles | Average particle size of conductive particles (μm) | Blast pressure of blast treatment (MPa) | Contact resistance before power generation (mΩ·$cm^2$) | Contact resistance after power generation for 5000 hours (mΩ·$cm^2$) |
|---|---|---|---|---|---|---|---|
| Inv. Ex. 1 | 0.1 | 4.8 | $Cr_2N$ | 0.1 | 0.3 | 6.4 | 8.4 |
| Inv. Ex. 2 | 3.2 | 8.7 | $CrSi_2$ | 0.5 | 0.5 | 5.3 | 7.3 |
| Inv. Ex. 3 | 1.2 | 10.5 | VB | 1.2 | 0.4 | 6.2 | 8.4 |
| Inv. Ex. 4 | 0.5 | 6.7 | $V_8C_7$ | 3 | 0.3 | 7.1 | 9.3 |
| Inv. Ex. 5 | 4.8 | 9.3 | VN | 5 | 0.35 | 6.3 | 7.8 |
| Inv. Ex. 6 | 1.3 | 10.3 | TaN | 0.8 | 0.3 | 6.1 | 7.6 |
| Inv. Ex. 7 | 3.6 | 8.3 | TaC | 0.5 | 0.45 | 8.2 | 11.2 |
| Inv. Ex. 8 | 3.2 | 5.2 | WC | 1.2 | 0.4 | 6.3 | 8.4 |
| Inv. Ex. 9 | 0.8 | 4.8 | WN | 17 | 0.5 | 5.3 | 7.2 |
| Inv. Ex. 10 | 0.9 | 7.4 | TaN and WC | 0.6 and 1.2 | 0.3 | 4.9 | 6.3 |
| Inv. Ex. 11 | 3.8 | 5.9 | TaC and WC | 2.5 and 0.8 | 0.35 | 5.3 | 8.1 |
| Inv. Ex. 12 | 4.2 | 13.5 | $Cr_2N$ and VB | 0.3 and 0.8 | 0.4 | 4.2 | 5.4 |
| Inv. Ex. 13 | 1.8 | 10.7 | TaN | 0.7 | 0.02 | 5.9 | 7.1 |
| Inv. Ex. 14 | 3.2 | 8.7 | TaN and WC | 0.8 and 1.3 | 0.06 | 5.3 | 6.6 |
| Inv. Ex. 15 | 0.4 | 11.5 | TaN | 0.9 | 0.1 | 5.1 | 6.7 |
| Comp. Ex. 1 | 14.2 | 5.4 | TaN | 0.5 | 0.3 | 6.4 | 632.2 |
| Comp. Ex. 2 | 3.2 | 7.9 | TiC | 3 | 0.5 | 7.2 | 324.5 |
| Comp. Ex. 3 | 1.2 | 8.2 | VN | 0.005 | 0.4 | 6.3 | 892.5 |
| Comp. Ex. 4 | 2.8 | 32.5 | VB | 1.3 | 0.35 | 20.4 | Initial contact resistance high, so power generation te3st not run |

TABLE 2

| | Average carbon concentration (at %) in range of 100 nm from titanium surface | Titanium surface oxide thickness (nm) | Type of conductive particles | Average particle size of conductive particles (μm) | Concentration of nitric acid solution (mass %) | Treatment time (min) |
|---|---|---|---|---|---|---|
| Inv. Ex. 1 | 0.3 | 4.2 | $Cr_2N$ | 0.1 | 71 | 5 |
| Inv. Ex. 2 | 3.7 | 9.3 | $CrSi_2$ | 0.5 | 35 | 0.5 |
| Inv. Ex. 3 | 0.8 | 10.5 | VB | 1.2 | 15 | 20 |
| Inv. Ex. 4 | 0.5 | 5.2 | $V_8C_7$ | 3 | 59 | 5 |
| Inv. Ex. 5 | 4.8 | 9.1 | VN | 5 | 20 | 1 |

TABLE 2-continued

| | | | | | | |
|---|---|---|---|---|---|---|
| Inv. Ex. 6 | 1.3 | 13.8 | TaN | 0.8 | 30 | 115 |
| Inv. Ex. 7 | 2.2 | 8.3 | TaC | 0.5 | 40 | 30 |
| Inv. Ex. 8 | 0.9 | 5.2 | WC | 1.2 | 45 | 30 |
| Inv. Ex. 9 | 0.8 | 7.8 | WN | 17 | 25 | 60 |
| Inv. Ex. 10 | 1.3 | 7.7 | TaN and WC | 0.6 and 1.2 | 30 | 60 |
| Inv. Ex. 11 | 2.9 | 8.3 | TaC and WC | 2.5 and 0.8 | 55 | 20 |
| Inv. Ex. 12 | 4.2 | 13.5 | $Cr_2N$ and VB | 0.3 and 0.8 | 30 | 30 |
| Inv. Ex. 13 | 3.6 | 8.9 | TaN | 0.8 | 59 | 70 |
| Inv. Ex. 14 | 0.2 | 12.5 | TaN and WC | 0.7 and 1.4 | 38 | 180 |
| Inv. Ex. 15 | 3.8 | 9.3 | TaN | 0.9 | 30 | 119 |
| Inv. Ex. 16 | 3.4 | 8.7 | $Cr_2N$ | 0.2 | 35 | 30 |
| Inv. Ex. 17 | 0.7 | 7.8 | $V_8C_7$ | 0.7 | 45 | 50 |
| Comp. Ex. 1 | 15.3 | 7.8 | TaN | 0.5 | 5 | 0.5 |
| Comp. Ex. 2 | 3.2 | 7.9 | TaN | 3 | 15 | 0.1 |
| Comp. Ex. 3 | 2.8 | 28.5 | VB | 1.3 | Not treated | — |
| Comp. Ex. 4 | 2.7 | 8.4 | WC | 0.5 | 30 | 5 |

| | Treatment temp. (°C.) | Treatment method | Particle size of superhard core particles (μm) | Blast pressure of blast treatment (MPa) | Contact resistance before power generation ($m\Omega \cdot cm^2$) | Contact resistance after power generation for 5000 hours ($m\Omega \cdot cm^2$) |
|---|---|---|---|---|---|---|
| Inv. Ex. 1 | 60 | Dipping | 200 | 0.5 | 8.8 | 11.5 |
| Inv. Ex. 2 | 100 | Spraying | 300 | 0.3 | 8.2 | 10.9 |
| Inv. Ex. 3 | 70 | Dipping | 120 | 0.2 | 6.2 | 8.4 |
| Inv. Ex. 4 | 60 | Dipping | 180 | 0.3 | 7.1 | 9.3 |
| Inv. Ex. 5 | 75 | Spraying | 300 | 0.2 | 6.3 | 7.8 |
| Inv. Ex. 6 | 50 | Dipping | 150 | 0.2 | 6.1 | 7.6 |
| Inv. Ex. 7 | 55 | Dipping | 150 | 0.3 | 8.2 | 9.8 |
| Inv. Ex. 8 | 45 | Dipping | 170 | 0.3 | 6.3 | 8.4 |
| Inv. Ex. 9 | 55 | Dipping | 100 | 0.5 | 5.3 | 7.2 |
| Inv. Ex. 10 | 50 | Dipping | 160 | 0.2 | 4.9 | 6.3 |
| Inv. Ex. 11 | 45 | Dipping | 180 | 0.3 | 5.3 | 8.1 |
| Inv. Ex. 12 | 50 | Dipping | 200 | 0.3 | 4.2 | 5.4 |
| Inv. Ex. 13 | 50 | Dipping | 150 | 0.02 | 4.7 | 5.9 |
| Inv. Ex. 14 | 40 | Dipping | 200 | 0.06 | 4.8 | 6.1 |
| Inv. Ex. 15 | 40 | Dipping | 180 | 0.1 | 4.9 | 6.2 |
| Inv. Ex. 16 | 50 | Dipping | 250 | 0.05 | 7.8 | 10.4 |
| Inv. Ex. 17 | 45 | Spraying | 300 | 0.02 | 7.9 | 10.7 |
| Comp. Ex. 1 | 40 | Spraying | 150 | 0.2 | 9.5 | 632.2 |
| Comp. Ex. 2 | 45 | Dipping | 200 | 0.3 | 8.7 | 543.2 |
| Comp. Ex. 3 | — | — | 180 | 0.3 | 7.3 | 873.5 |
| Comp. Ex. 4 | 25 | Dipping | 200 | 0.2 | 9.8 | 645.3 |

INDUSTRIAL APPLICABILITY

According to the present invention, it is possible to provide a polymer electrolyte fuel cell separator made of titanium preventing the titanium ions eluted from the separator made of titanium surface from forming titanium oxide on the surface of the conductive compound particles affixed to the titanium surface layer part when using the polymer electrolyte fuel cell, having a low contact resistance with carbon paper at a surface pressure of 1.0 MPa (10 kgf/cm$^2$) of 15 mΩcm$^2$ or less, and having little deterioration of the contact resistance at the time of use and consequent drop in electromotive force, and a method of production of the same.

The invention claimed is:
1. A polymer electrolyte fuel cell separator made of pure titanium or a titanium alloy having a surface layer part to which conductive compound particles are affixed, said polymer electrolyte fuel cell separator made of pure titanium or a titanium alloy characterized in that the pure titanium or titanium alloy has a surface oxide of a thickness of 3 to 15 nm in range, an average carbon concentration in a range from an outermost surface, including the oxide layer of the pure titanium or titanium alloy, to a depth of 100 nm is 0.4 to 6 at %, and said conductive compound particles have an average particle size of 0.01 to 20 μm and a density per unit area at a separator surface part of 1×10$^8$/cm$^2$ or more, wherein said conductive compound particles comprise one or more of $Cr_2N$, $CrSi_2$, VB, $V_8C_7$, VN, TaN, TaC, and WN.

* * * * *